E. J. SHAFER.
SAW SHARPENER.
APPLICATION FILED FEB. 3, 1908.

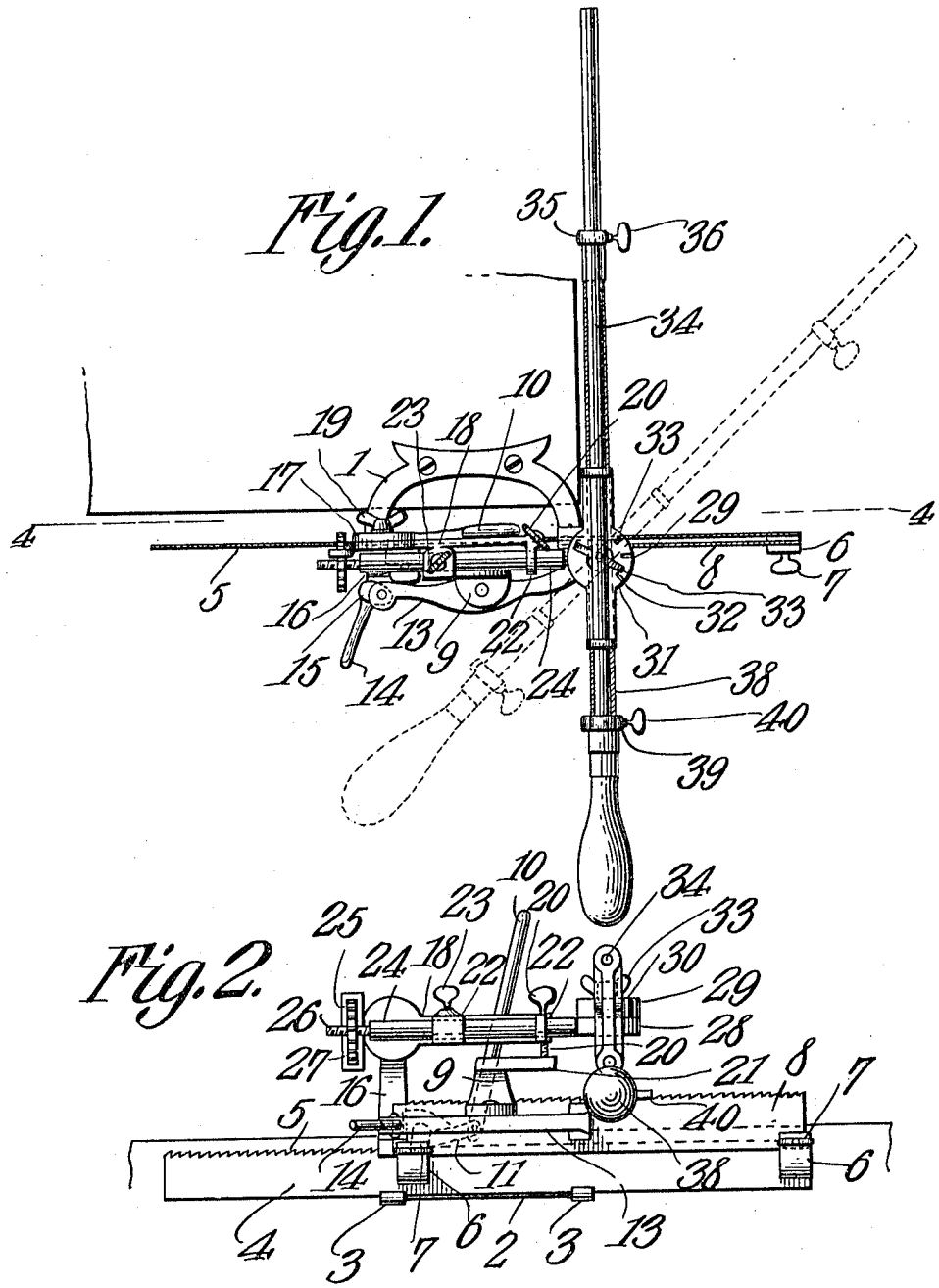

945,201.

Patented Jan. 4, 1910.
2 SHEETS—SHEET 2.

Inventor
Eliza J. Shafer.

Witnesses

By C. A. Snow & Co.
Attorneys

UNITED STATES PATENT OFFICE.

ELIZA J. SHAFER, OF BERKELEY, CALIFORNIA.

SAW-SHARPENER.

945,201.  Specification of Letters Patent.  Patented Jan. 4, 1910.

Application filed February 3, 1908. Serial No. 414,083.

*To all whom it may concern:*

Be it known that I, ELIZA J. SHAFER, a citizen of the United States, residing at Berkeley, in the county of Alameda and State of California, have invented a new and useful Saw-Sharpener, of which the following is a specification.

This invention has relation to saw sharpeners and it consists in the novel construction and arrangement of its parts as hereinafter shown and described.

The object of the invention is to provide a sharpener having a means for holding a saw blade in proper position and various parts having a multiplicity of adjustments whereby the file may be presented to the teeth of the saw at any desired angle during the operation of sharpening the same.

The sharpener is provided with means for shifting the saw longitudinally in order to successively bring the teeth thereof under the file.

The parts of the device are so arranged that the teeth of the saw may be filed with the greatest accuracy, uniformity and precision.

Figure 3:
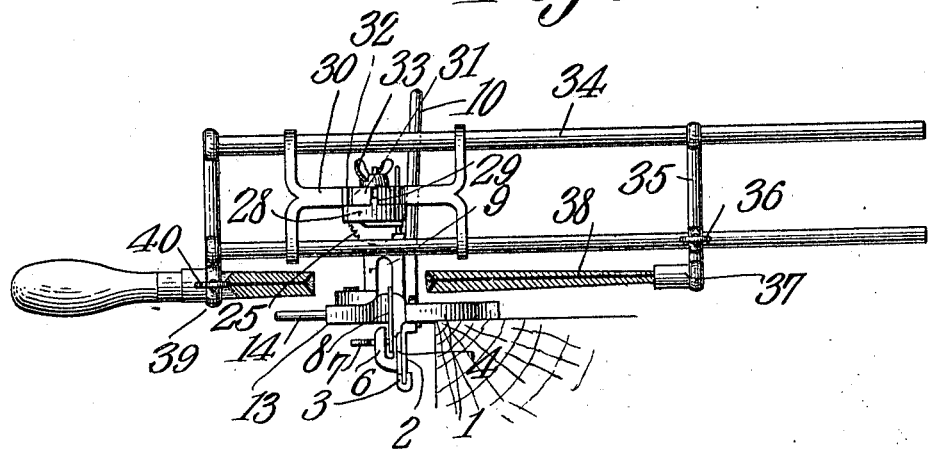
Figure 4:
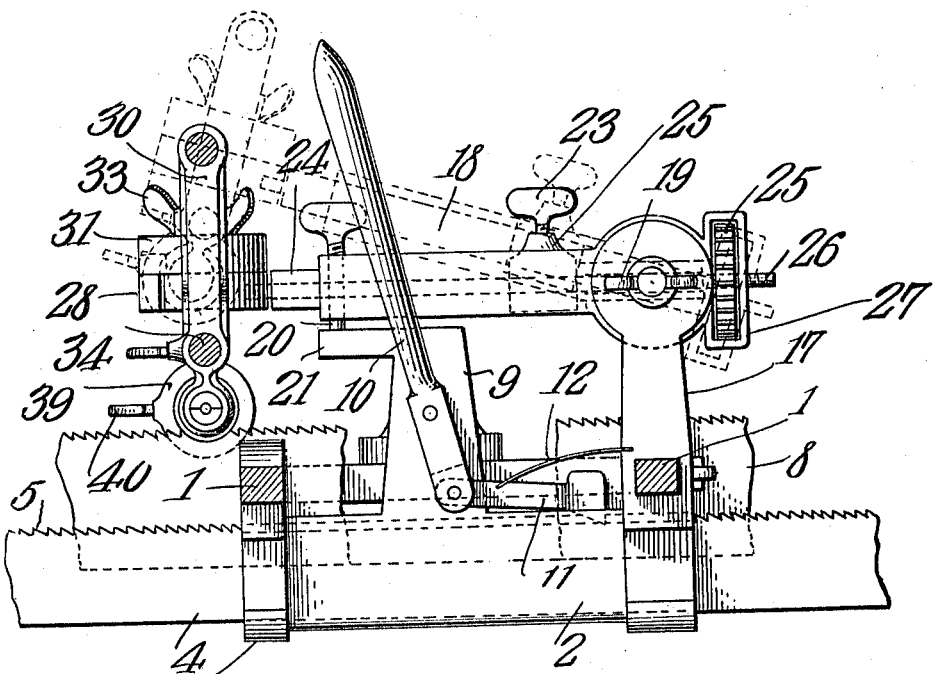

In the accompanying drawings: Figure 1 is a top plan view of the saw sharpener. Fig. 2 is a side elevation of the same. Fig. 3 is an end elevation of the same, and Fig. 4 is a vertical sectional view of the same enlarged and cut on the line 4, 4 of Fig. 1.

The sharpener consists of the bracket 1 which is adapted to be attached to a work bench or other suitable support. Said bracket is provided at one side with a depending plate 2 which in turn is provided at its upper and lower edges with the lugs 3. The inner edges of the lugs 3 are beveled and form guides for the reception of the strip 4 which is provided at its upper edge with the teeth 5 and upon its outer side with the lugs 6 each of which is provided with a set screw 7. The saw blade 8 may be inserted in the space between the strip 4 and the lugs 6 thereof and when so positioned is clamped against the strip 4 by means of the set screws 7. The strip 4 is adapted to move longitudinally between the lugs 3, suitable means being provided for moving the said strip longitudinally at intervals and for securing the same in fixed positions at other times. The inverted U-shaped standard 9 is mounted upon the bracket 1 and the lever 10 is fulcrumed to the said standard and its working end is pivotally connected with the pawl 11 which is adapted to engage the teeth 5 of the strip 4. The spring 12 bears against the said pawl and is under tension with a tendency to hold the pawl in engagement with the teeth 5. It is obvious that by swinging the lever 10 the pawl 11 will be reciprocated longitudinally and as it escapes the teeth 5 when moved in one direction and engages the said teeth when moved in the opposite direction the strip 4 and its attachments will be moved longitudinally with relation to the bracket 1. The clamping lever 13 is fulcrumed to the outer end of the standard 9 and is provided at one end with a locking handle 14 which is provided with a pivotally mounted eccentric end 15. The end portion 15 of the said handle 14 may be forced into engagement with the lug 16 upon the standard 17 and when so moved the lever 13 is swung upon its fulcrum so that the working end of the said lever will bear laterally against the saw 8 and clamp the same in fixed position against the edge of the bracket 1. Thus, it will be observed that means is provided for shifting the said saw longitudinally and a separate means is provided for holding the said saw in a fixed position.

The arm 18 is pivotally mounted upon the standard 17 and the pivot bolt of the said arm 18 is provided with a wing nut 19 which when tightened fixes the arm 18 with relation to the standard 17 and which when loosened permits the said arm 18 to swing with relation to the standard 17. The free end portion of the arm 18 is provided with a screw 20 which may be shifted transversely through the said arm and which is adapted to engage the anvil 21 mounted upon the standard 9. Thus, the said arm 18 when in its lowermost position may be moved from a horizontal position into a slightly inclined position and vice versa by adjusting the screw 20 upon the arm 18. Furthermore, by adjusting the said screw a precise means is provided for bringing the arm 18 to a horizontal or approximately horizontal position after it has been swung back upon its pivotal connections with the standard 17. The arm 18 is provided upon its outer side with the guides 22, one of which is provided with a set screw 23. The spindle 24 passes through the guides 22 and may be shifted longitudinally therein by means of the disk 25 which engages the threaded end portion 26 of the said spindle and which lies in the opening provided in the yoke 27 attached to the arm 18. When the spindle 24 has been properly adjusted longitudinally in the guides 22 it is held in such adjusted position by the set screw 23. The head block 28 is mounted upon the opposite end of the arm 18 from that end upon which the wheel 25 is mounted. Said block is provided at its periphery with an upstanding lug 29. The cross head 30 is mounted upon the block 28 and is provided at its middle with a circular portion 31 having at its periphery a series of recesses 32 any one of which is adapted to receive the lug 29 upon the block 28. The cross head 30 is clamped to the block 28 by means of a bolt and wing nut 33. Thus means is provided for changing the vertical plane of the cross head 30.

The file frame is slidably mounted in the cross head 30 and consists of the parallel bars 34 which pass through the said cross head at opposite sides of the middle portion 31 thereof. The socket rod 35 is slidably mounted upon the bars 34 and is provided with a set screw 36 by means of which the said rod may be fixed with relation to the said bars. The socket 37 is attached to the lower end of the rod 35 and is adapted to receive the end of the file 38. The annulus 39 depends from the outer or forward ends of the bars 34 and is provided with a set screw 40. Said annulus is adapted to receive the handle portion of the file 38 and permits of the said file being turned or adjusted axially prior to being fixed in its position by means of the set screw 40. The rod 35 is adjustably mounted upon the bars 34 in order that the parts may be adjusted to receive files of different lengths. Thus it will be seen that by swinging the free end of the arm 18 up the file frame and file is moved away from the work so that the view of the operator is unobstructed when inspecting the same. The file frame may be so positioned that the file will operate upon the saw in a plane at a right angle thereto or at an acute angle. Also the file may be adjusted axially so that the side thereof may be presented to the teeth of the saw at any desired angle of inclination.

It will also be seen that after the parts of the device are once adjusted with relation to each other the parts may be readily moved as described from operative positions into other positions and back again into operative positions without varying or altering the predetermined adjustments. Thus, the teeth of a saw may be sharpened with great accuracy, uniformity and precision throughout.

Having thus described my invention, what I claim as new and desire to secure by Letters Patent is:

The combination with a bracket, saw engaging means, and a feed device for shifting said means, of a head block adjustably supported above the bracket, a projection thereon, a cross head having an enlarged middle portion provided with a series of openings, any one of said openings being disposed to receive the projection, a combined pivot and clamping member extending from the head block and through the cross head, and a file-carrying frame slidably mounted in the cross head.

In testimony that I claim the foregoing as my own, I have hereto affixed my signature in the presence of two witnesses.

ELIZA J. SHAFER.

Witnesses:
JAMES HARRIS,
DAVID CRAIG.